United States Patent [19]

Schoenholz et al.

[11] 3,949,107

[45] Apr. 6, 1976

[54] METHOD OF POLISHING FLOORS

[75] Inventors: Daniel Schoenholz, Basking Ridge, N.J.; Herbert Terry, Wilton, Conn.

[73] Assignee: Liggett & Myers Incorporated, Durham, N.C.

[22] Filed: May 31, 1974

[21] Appl. No.: 475,300

[52] U.S. Cl. ............... 427/316; 427/317; 427/322; 427/375
[51] Int. Cl.² ........................................... B05D 3/02
[58] Field of Search .......... 117/47 H, 57, 138.8 UT, 117/161 UC; 260/28.5 A, 29.6 TA, 28.5 X; 427/316, 317, 385, 393, 322, 325

[56] References Cited
UNITED STATES PATENTS

| 2,606,165 | 8/1952 | Chapin | 260/28.5 A |
|---|---|---|---|
| 3,311,583 | 3/1967 | Bearden | 260/29.6 TA |
| 3,328,325 | 6/1967 | Zdanowski | 260/28.5 A |
| 3,347,811 | 10/1967 | Bissot | 260/29.6 H |
| 3,352,806 | 11/1967 | Hicks | 260/33.4 |
| 3,403,119 | 9/1968 | Sullivan | 260/28.5 A |
| 3,405,084 | 10/1968 | Bohac | 260/29.6 TA |
| 3,412,059 | 11/1968 | Stickelmeyer | 260/29.6 TA |
| 3,429,842 | 2/1969 | Wolstoncroft | 260/28.5 |
| 3,457,208 | 7/1969 | Sullivan | 260/28.5 A |

*Primary Examiner*—Michael R. Lusignan
*Attorney, Agent, or Firm*—Charles A. Muserlian; Michael L. Hendershot; J. Bowen Ross, Jr.

[57] ABSTRACT

A method of forming a bright-drying floor finish on a resilient flooring comprising applying a polish containing an aqueous dispersion of fine particles of a resin with a Tg of 30° to 80°C to a flooring, preferably a resilient flooring, with at least one of said polish or said flooring having been preheated to a temperature above the glass transition (Tg) temperature of said resin, and drying said polish to produce said bright-drying floor finish.

10 Claims, No Drawings

METHOD OF POLISHING FLOORS

STATE OF THE ART

It has been attempted in the prior art to produce bright-drying floor finish systems for resilient flooring. Resilient flooring is typified by asphalt, vinyl asbestos or vinyl tile, vinyl sheet goods, etc. Resilient flooring is markedly enchanced in terms of appearance, resistance to scratching and other deleterious traffic effects as well as overall durability by periodic maintenance by a finish which will yield a gloss, fill in incipient scratches, protect the surface against ground in dirt and generally act as a buffer layer between the flooring surface and the normal wearing resulting from use in areas such as kitchens, playrooms, corridors and other areas where resilient flooring is employed. It is convenient and highly desirable that such a finish be bright-drying; i.e., yielding a significant gloss without additional buffing, since this eliminates an otherwise labor intensive and arduous operation.

Early bright-drying finishes were prepared by emulsifying natural waxes such as carnauba or candelilla and modifying the resultant dispersions in some cases with materials such as shellac or other alkali soluble gums or resins. Such compositions were efficacious in providing finishes which enhanced the appearance of the flooring on initial application. These finishes had the disadvantages that the durability of the finish was highly limited, both in terms of physical toughness and in resistance to water spotting, with the result that frequent cleaning and reapplication were necessary. A significant advance in this area resulted from utilization of fine particle dispersions of synthetic resins. Initially, polyvinyl acetate and polystyrene dispersions were employed; subsequently, acrylic resin dispersions were found to be more suitable. Currently, most bright-drying finishes for resilient flooring which are commercially sold both for residential and commercial use are based on synthetic resin dispersion, often modified with various materials, including wax dispersions of various types in some cases. Such dispersions provide the benefits of a significant degree of gloss on drying, combined with a fairly high degree of toughness in terms of resistance to scratching, black heel marking, or soil retention. In addition, the use of so-called zinc complex containing cross-linkable systems has served to provide finishes which have a high degree of resistance to water spotting and to common detergent cleaning, but which will still retain the ability to be removed by ammonia containing cleaners. However, despite the significant advance over the earlier wax based systems, these current synthetic resin based materials have the disadvantages of limited durability; and consequently they are limited in the benefits they provide relative to decreasing the effort involved in floor maintenance.

The limited durability is in large part the result of a lack of film toughness which can be related to scratch resistance. Thus, the best of commercial floor finishes of this type will deposit a glossy continuous non-tacky film of apparently good integrity. However, a simple fingernail scratch test shows that the film is in fact easily scratched. The consequence is that as soon as foot or other normal traffic begins, scratching immediately starts. These scratches become focal points for trapping abrasive dirt which is subsequently picked up during additional traffic, causing further scratching, etc. It is therefore clear that films of comparable or greater gloss and hardness but with a significantly greater degree of scratch resistance would represent an important advance in the art.

The synthetic systems consist essentially of dispersions of resin particles in water. The particles are two-tenths of a micron or less in diameter, with each particle being surrounded by a layer of protective colloid. When a thin, wet film of such a material is applied to a floor, evaporation of water begins and, as the concentration of non-volatile material rises, forces are set up which impinge the resin particles upon each other and which finally create a fixed matrix of resin particles in which the individual particles are sufficiently well-adhered to each other. The number of particles provides a density sufficient to yield an optically clear and glossy film after all the water has evaporated, the film possessing sufficient integrity to resist at least for a time the traffic to which it is normally subjected.

This mechanism has the disadvantage of placing significant constraints on the properties of the synthetic resin represented by the latices which are suitable for this purpose. The particles must be sufficiently soft and deformable so that under the forces resulting in film agglomeration as water evaporates there will in fact be sufficient surface contact between particles and sufficient coalescence among particles to yield the gloss and integrity required. If this is not the case, the results will be a poorly bound film with poor gloss and poor integrity. If a latex is used consisting of very rigid, non-deformable particles, the resultant film after drying will consist simply of a very brittle, hazy or opaque film which will powder off on simple contact. In fact, in commercial compositions, it is common practice to incorporate materials such as plasticizers and volatile solvents in minor quantities as coalescing aids. These serve the function of rendering the particles more deformable and hence easier to coalesce, particularly under the more extreme circumstances encountered in ambient applications. Such extreme circumstances occur when the temperature and/or the humdity are low so that the normally thermoplastic resin particles are less deformable than at more normal ambient temperatures; and/or the rate of water evaporation is greater than normal because of the low humidity, thus reducing the amount of time available to effect coalescence before the matrix is "frozen" by elimination of water.

It is clear that the indicated constraints on the physical properties and composition of the current synthetic resin latex based finishes control and restrict the ultimate scratch resistance and thus, the overall durability which can be anticipated from such systems. That is, the same characteristics which provide deformability and subsequent ability to coalesce also insure that there will be deformability under traffic; dirt particles will be ground into the surface and then eventual irreparable disfigurement and erosion will take place within a typically narrow time frame, usually about 3 to 4 weeks.

OBJECTS OF THE INVENTION

It is an object of the present invention to form a bright-drying floor finish on a resilient flooring by employing resin polymers which are tougher and less deformable under ambient conditions and which hence will provide greater scratch resistance by means of having coalescence take place on the floor under heated conditions above the glass transition temperature of said resin.

It is a further object of the present invention to provide a method of forming a bright-drying floor finish on a resilient flooring comprising applying a polish containing an aqueous dispersion of fine particles of a resin having a Tg of 30° to 80°C to a resilient flooring, with at least one of said polish or said flooring having been preheated to a temperature above the glass transition temperature of said resin, and drying said polish to produce said bright-drying floor finish.

These and further objects of the present invention will become apparent as the description thereof proceeds.

DESCRIPTION OF THE INVENTION

The present invention provides a method of forming a bright-drying floor finish on a resilient flooring comprising employing resin polymers which are tougher and less deformable under ambient conditions and which hence will provide greater scratch resistance by means of having coalescence take place on the floor under heated conditions at a temperature above the glass transition temperature of the resin.

More particularly the present invention provides a method of forming a long lasting bright-drying floor finish on a resilient flooring comprising applying a polish containing an aqueous dispersion of fine particles of a resin with a Tg of 30° to 80°C to a resilient flooring, with at least one of said polish or said flooring having been preheated to a temperature above the glass transition temperature of said resin, and drying said polish to produce said long lasting, bright-drying floor finish.

These beneficial results may thus be derived by heating the resin above the glass transition temperature in any one of these three modes, or in a combination thereof as follows:

Mode I — Preheating the polish

In this mode the polish composition is preheated to a suitable temperature, for example, 70°C., and is applied to the floor. Although contact with the cold floor and subsequent evaporation both tend to lower the temperature of the liquid polish rapidly, the temperature is still substantially higher than under normal circumstances and better coalescence is thereby obtained. Thus the polish is maintained above the glass transition temperature during its application to the cold floor for a period of time sufficient to produce the desired results.

Mode II — Preheating the floor

It is possible to preheat the flooring surface to a high enough temperature just prior to application of the liquid polish so that transference of this energy to the liquid as it is applied again results in improved coalescence. The temperature of the polish is raised to a temperature above its glass transition temperature for a period of time sufficient to produce the desired results.

Mode III — Post-Heating after application

As a supplemental step, it is also possible to combine either one or both of modes I and II with a supplemental post-heating step after application to anneal the film after it has coalesced on the flooring surface and this improves the durability thereof.

To obtain the heat effect in the Modes indicated so as to obtain the practical benefits of this approach in actual treatment of flooring surfaces will of course require special equipment. Thus, in Mode I where the polish is preheated, it will be necessary to have a polish applicator suitably equipped with a reservoir and element which will permit preheating of the liquid polish either in the reservoir or at some stage between the reservoir and the point of dispension onto the flooring surface.

In Mode II, where the floor is preheated prior to application of the polish, an applicator for dispensing the polish from a reservoir is also necessary but heat source such as heat lamps, radiant bars or other suitable means will have to be suitably disposed on the applicator so as to heat the floor in an area which extends beyond the immediate boundaries of application so that as the applicator is moved to an adjacent section, some preheating has already been accomplished. It is evident that the use of Modes I and II can easily be combined by making provision both for heating the liquid polish and preheating the floor area in the manner described through suitable design of the applicator device.

In the third Mode, if post-heating of the dried film were the only mechanism to be employed, a device would still be necessary but for accomplishing the post-heating rather than for application. This then would be a device equipped with a heat emission capability which would travel over the floor so as to fuse and anneal the surface of the dried polish film. Again, it is of course feasible to utilize a device suitable for Mode II as a means also of post-heating the floor so as to provide a combination of Modes II and III; and in consequence, if desirable, of all three Modes.

Each of the three modes of heating can affect the properties of the final film in distinctive as well as overlapping ways. Thus, in Mode I where the liquid polish is preheated, there are two mechanisms at work. One is to soften the resin particles so that per given degree of force applied, the particles which impinge on each other will fuse more quickly and more completely. It is of course true that since the temperature of the aqueous medium in which the particles are dispersed is also increased, evaporation will occur more quickly, leaving less time for fusion to occur. However, this effect is offset by the fact that at the higher temperatures the Brownian movement of the dispersed particles is speeded up so that opportunities for particle collision and fusion as the water evaporates are correspondingly increased. Thus, the net effect is to provide a more continuous, tougher and more scratch resistant film than would be obtainable by application at room temperature.

Using Mode II, where the flooring surface is preheated, the benefits will result from transfer of heat energy from the floor to the liquid polish and thus will be similar to those provided in Mode I except that the major action will tend to occur close to the liquid polish/solid floor substrate. In Mode III as noted earlier, the basic effect, since it takes place after the water has evaporated, is primarily to fuse and anneal the film at the surface. Thus, it is clear from consideration of the three Modes and associated mechanism that a combination of the Modes, particularly of Modes I and II, will in fact produce the most desirable and optimum effects with respect to improved durability of the finish polish film.

While resilient flooring represents the greatest single application for bright drying finishes, these bright drying finishes are also particularly suitable, and with superior durability, for use over other types of flooring, for example, sealed terrazzo, stone, marble, and other masonry flooring; even over wooden flooring which has been suitably sealed or finished to exclude moisture, and over various composition type floorings which may not be classified as resilient in nature.

Formulation of a polish is a complex matter. It is clear that a harder, tougher, more scratch resistant film provides the inherent basis for a more durable polish and the following examples indicate how the three modes of treatment provide such effects in contrast to ambient room temperature film formation. However, it must be remembered that beyond this point additional formulation is necessary to insure translation of these benefits into an overall polish with improved durability. For example, a harder film is desirable, but it must not be so brittle that normal flexing of the floor will cause flaking away from the substrate at an excessive rate. Thus, formulation, which includes proper selection of the basic resin and its modifications is essential in order to maximize the principles taught in this application. These principles permit use of resins which may be used in conventional formulations, but which must otherwise be modified to the point where the inherent hardness and toughness of the resin is lost.

The glass transition temperature of the resin is that temperature at which the resin polymer melts into a uniform mass. The glass transition temperature of the resin ranges from about 30° to 80°C, and preferably ranges from about 40°C to 50°C. The heating temperature utilized for Modes I or II ranges from about 40° to 90°C, and preferably ranges from 50° to 70°C. The heating temperature utilized for Mode III ranges from about 50° to 120°C. Modes I or II may be utilized individually for conducting the claimed method, or preferably they may be utilized in combination with each other. Mode III may be utilized only in combination either with Mode I, or with Mode II or with a combination of Modes I and II. In carrying out the method of the invention, either the polish, or the resilient flooring to which the polish is applied, or both, are heated to a temperature above the glass transition temperature of the resin in the polish. The polish then dries on the flooring to produce a bright-drying floor finish.

However it is additionally possible to further heat the dried polish on the resilient flooring to produce a bright-drying floor finish.

Suitable examples of resins to be used according to the method of the present invention include any chemical compounds or mixtures of compounds currently found suitable for floor finishing purposes, such as polymers of vinyl acetate, vinyl chloride, vinylidene chloride, styrene, copolymers of ethylene and vinyl acetate, copolymers of acrylates, copolymers of methacrylates, or the mixtures thereof. Preferred are copolymers of acrylates and methacrylates, usually in the form of their emulsions or dispersions.

More particularly, the various acrylic emulsions are supplied in the 40 to 45% solids range and can be further characterized as follows. The filming capabilities of the unmodified emulsions correlate excellently with the Tg values, despite differences in colloidal charge, reactivity, zinc cross-linking, etc. Several of the emulsions with high Tg values and which show poor filming unmodified, notably B217 and B336, are in fact used in commercial floor finishes. However, for this purpose they must be heavily modified with from 20 to 30% of coalescing agents based upon the weight of dry polymer. The effect of this is to lower the actual Tg, and also to soften the dry film. Thus it makes the film more susceptible to scratching and other abrasive effects, particularly during the early stages after drying.

Typically, a floor finish of this prior art type will contain: (a) base polymer emulsion, usually an acrylic (b) an alkali soluble resin designed to promote removeability (c) a polyethylene resin for black heel mark resistance, (d) semi-volatile coalescing agents, such as ethylene glycol and monoethyl ether of diethylene glycol, (e) a permanent plasticizer such as tributoxyethyl phosphate, and (f) a surfactant to promote wetting and leveling during application.

The glycols and plasticizers are the materials which lower the effective Tg and in so doing, render the film vulnerable to scratching. The use of heating according to the invention obviates the need for the coalescing agents, and thereby results in a tougher film both initially and after aging. With the present method, good removeability requires little or no alkali soluble resin, possibly because solvents or plasticizers which can attack the vinyl flooring and "weld" the polish to the floor on aging, are not incorporated into the compositions utilized according to the invention.

Table I provides a definition of the essential ingredients along with their glass transition temperature, found in the Rohm & Haas products utilized according to the present invention in the following examples.

TABLE I

| Acrylic Resin | Tg 0°C | Manufacturers' Description |
| --- | --- | --- |
| HA16 | 22 | Nonionic, self-reactive acrylic emulsion. |
| SS90 | 32 | Medium-hard acrylic polymer, anionic charge. |
| B217 | 40 | Modified acrylic copolymer, anionic colloidal charge, Tukon hardness 13 to 15. |
| B336 | 50 | Anionic colloidal charge, Tukon film hardness of 13 to 15, zinc cross-linked acrylic polymer. |
| B306 | 60 | Acrylic copolymer. |
| B 924 | 70 | Acrylic copolymer. |
| B85 | 90 | Extremely hard acrylic polymer anionic charge, Tukon hardness of 22. |

The term "Tukon hardness" is a standardized hardness determination for films of polish utilizing a Tukon Microhardness Tester apparatus which reports hardness as a Knoop Hardness Number. This procedure is used by Rohm and Haas.

Various other products utilized in the following examples contain the following essential ingredients:

"Carbitol" acetate is a trademark for diethylene glycol monoethyl ether, acetate, as defined on page 176 of *The Condensed Chemical Dictionary* (1966) Seventh Edition, Reinhold Publishing Corp.

Butyl "Cellosolve" is a trademark for ethylene glycol monobutyl ether, as defined on page 190 of said *The Condensed Chemical Dictionary*.

"KP-140" is a trademark for the plasticizer material tributoxyethyl phosphate (q.v.), as defined on page 537 of said *The Condensed Chemical Dictionary*.

Further products include the following:

"B505" is an acrylic latex; "SMA 1000" is a composition containing a copolymer of styrene-maleic anhydride; "SHANCO 60-121" is a trademark for resin composition having the following characteristics: acid number of 195–205, melting point (Rand B) ASTM E28-58T of 169–179 and color, 15% N.V. aqueous, ASTM D-1544-65T of 6–7. "FC-128" are potassium salts of perfluorated aliphatic carboxylic acids as defined in CHEMIE LEXIKON, 1966, page 1990; "Poly N50" is a dispersion of polyethylene; and "Latex U2111" is a styrene-acrylic acid based composition.

The following examples are merely illustrative of the present invention without being deemed limitative in any manner thereof.

EXAMPLE 1

A series of seven acrylic resin dispersions was obtained from the Rohm and Haas Co., Inc. These were identified as similar in chemical constitution, but with glass transition temperatures (Tg) of the base resins varying from 22°C to 90°C., roughly at 10°C intervals. The accompanying Tables II, III and IV show the characteristics of the resultant films:
a. Applied at room temperature
b. Applied using Mode I at 60°C
c. Applied using Mode II at 60°C
d. Applied using Modes I and II at 60°C Table II shows the results by verbal characterization. To permit easier comprehension and interpretation of the results, the verbal characterizations were transformed into a numerical scale, where 10 represents a fully continuous film and 0 represents a completely discontinuous film. Typical corresponding verbal characterizations for intermediate points are shown in Table III. The resultant transformation appears in Table IV. This table clearly leads to the following conclusions.

Film forming ability at room temperature, was inversely proportioned to Tg. Mode I at 60°C was somewhat effective in improving films through a Tg of 40°C however there was no effect at a Tg of 50°C. Mode II at 60°C was more effective than Mode I through a Tg of 40°C, but was only marginally effective at a Tg of 50°C. A combination of Modes I and II, both at 60°C, was markedly more effective than either Mode I or II alone, and showed benefits even at a Tg of 70°C. At a Tg of 90°C no benefits were seen with any treatment. It was not considered practical to utilize either Mode I or III at a temperature close to 90°C, which evidently would be necessary to obtain any significant effect at such a Tg. Attempts to use Mode III at temperatures as high as 100°C for one-half hour by treating the room temperature films did not result in any visiable improvement. Thus, it was concluded that Mode III can be used effectively only as an adjunct to Modes I and II.

TABLE II

Characteristics of Acrylic Resin Dispersions with Various Glass Transition Temperatures
(Verbal Characterization)

| Acrylic Resin | Tg °C. | (a) Room Temperature Film On Glass | (b) MODE I Hot Resin Cold Glass | (c) MODE II Cold Resin Hot Glass | (d) MODES I & II Hot Resin Hot Glass |
|---|---|---|---|---|---|
| HA16 | 22 | Clear, Soft, Continuous | Clear, Soft, Continuous | Clear, Soft, Continuous | Clear, Soft, Continuous |
| SS90 | 32 | Cloudy, Continuous in Center, Non-Continuous on Film Edges | Cloudy, Continuous Film | Clear Film, Some Cracks Visible | Clear Film, Some Cracks |
| B217 | 40 | Cloudy, Semi-Continuous Film | Partly Clear, Continuous Film | Clear Film, Some Cracks Visible | Clear Film, Some Cracks |
| B336 | 50 | Cloudy Film, Easily Scratched, Very Frangible | Powdery, Cloudy Film, Very Frangible | Slightly Cloudy Film, Little Integrity | Mostly Clear Film, Some Discontinuities |
| B306 | 60 | Cloudy Film, Easily Scratched, Very Frangible | Powdery, Cloudy Film, Very Frangible | Cloudy Deposit, Very Poor Film Integrity | Partly Clear Film, With Cracks |
| B924 | 70 | Cloudy Film, Powders Up With Slight Finger Pressure | Partly Cloudy, Powdery Deposit, No Film Integrity | Powdery Deposit, No Film Integrity | Partly Clear Film, Poor Integrity |
| B85 | 90 | Deposits As Non-Continuous Powder | Powdery Deposit, No Film Integrity | Powdery Deposit, No Film Integrity | Powdery Deposit, No Film Integrity |

TABLE III

Numerical Scale for Characterization of Films

| Numerical Indicator | Typical Verbal Description |
|---|---|
| 10 | Clear, Continuous Film |
| 9 | Clear Film, Some Cracking |
| 8 | Mostly Clear Film, Some Discontinuities |
| 7 | Partly Clear Film, Fairly Good Integrity |
| 6 | Partly Clear Film, Poor to Fair Integrity |
| 5 | Cloudy Film, Fair Integrity |
| 4 | Cloudy Film, Poor Integrity |
| 3 | Cloudy Film, Poor to Very Little Integrity |
| 2 | Cloudy Film, Very Little Integrity |
| 1 | Cloudy Film, Very Slight Integrity |
| 0 | Powdery Film, No Integrity |

TABLE IV

Characteristics of Acrylic Resin Dispersions with Various Glass Transition Temperatures (Numerical Characterization)

| Acrylic Resin | Tg °C. | (a) Room Temperature Film On Glass | (b) MODE I Hot Resin Cold Glass | (c) MODE II Cold Resin Hot Glass | (d) MODES I & II Hot Resin Hot Glass |
|---|---|---|---|---|---|
| HA16 | 22 | 10 | 10 | 10 | 10 |
| SS90 | 32 | 4 | 5 | 8 | 8 |
| B217 | 40 | 3 | 6 | 8 | 8 |
| B336 | 50 | 2 | 2 | 3 | 7 |
| B306 | 60 | 2 | 2 | 2 | 6 |
| B924 | 70 | 1 | 1 | 1 | 5 |
| B85 | 90 | 0 | 0 | 0 | 0 |

EXAMPLE 2

Polishes, as shown in Table V, were prepared using the four dispersions which gave the best results, as shown in Table IV. Films were deposited on vinyl asbestos floor tile, both at room temperature, and using a combination of Modes I and II at 60°C, with Future, a commercial polish as a control. The results indicated that with a Tg of less than 30°C, there was no benefit in employing the teachings of this invention. However, with the resins of a Tg at 40°C and 50°C, the heat treatment is noticeably beneficial.

TABLE V

Characteristics of Polish Films

| Polish Description | Tg of Base Resin, °C. | Cold Polish On Cold Tile | MODE I & II Hot Polish On Hot Tile |
|---|---|---|---|
| Future | — | Glossy, Easily Scratched | Glossy, Easily Scratched |
| HA16 | 22 | Glossy, Soft, Very Easily Scratched | Glossy, Soft, Very Easily Scratched |
| SS90 | 32 | Glossy, Easily Scratched | Glossy, Easily Scratched |
| B217 | 40 | Dull, Fairly Easily Scratched | Glossy, Very Difficult to Scratch |
| B336 | 50 | Very Dull, Difficult to Scratch | Glossy, Very Difficult to Scratch |

BASE POLISH FORMULATION

| | Parts by Weight |
|---|---|
| Resin Dispersion | 25.0 |
| Water | 48.0 |
| FC128 | 0.5 |
| Poly N50, (25%) | 4.0 |

EXAMPLE 3

Table VI further illustrates the advantages of using two of the high Tg polymers versus Future a commercial polish. The formulations used were compounded from the following ingredients.

| | A | B |
|---|---|---|
| B217 | 25 | — |
| B336 | — | 25 |
| Water | 48 | 48 |
| FC128 (1%) | 0.5 | 0.5 |
| Poly N50 (25%) | 4.0 | 4.0 |

The "cold" applications were made at ambient room temperature. The "hot" applications were made using a combination of Modes I and II by preheating the polish to 60°C and preheating the floor tile to 66°C before application.

TABLE VI

Two Coats on Vinyl Asbestos Tile
Floor Service Observations for Two Months
Relative Gloss as Applied on 9/28/ and on Subsequent Dates After Traffic

| | COLD | | | | HOT | | | |
|---|---|---|---|---|---|---|---|---|
| | 9/28/ | 10/25/ | 11/16/ | 11/28/ | 9/28/ | 10/25/ | 11/16/ | 11/28/ |
| A | Fair | None | None | None | Very Good | Good | Fair–Good | Poor |
| B | Poor | None | None | None | Good | Good | Fair | Poor |
| Future | Very Good | None | None | None | Very Good–Excellent | Poor | None | None |

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

What is claimed is:

1. The method of forming a bright-drying, long-lasting floor finish which comprises applying to a flooring a polish consisting essentially of an aqueous dispersion of a resin having a glass transition temperature of from about 30° to 80°C, heating at least one of said polish or said flooring to a temperature of from about 40° to 90°C just prior to application of said polish to said flooring and drying said polish to produce said finish.

2. The method of claim 1, in which said polish is preheated to a temperature of from about 40° to 90°C.

3. The method of claim 1, in which said flooring is resilient and is preheated to a temperature of from about 40° to 90°C.

4. The method of claim 1, in which said polish and said flooring are preheated to a temperature of from about 40° to 90°C.

5. The method of claim 1, further comprising annealing said finish at a temperature of from about 50° to 120°C.

6. The method of claim 1, in which said glass transition temperature of said resin is from about 40° to 50°C.

7. The method of claim 4, in which said glass transition temperature of said resin is from about 40° to 50°C.

8. The method of claim 5 wherein the resin has a glass transition temperature of from about 40° to 50°C.

9. The method of claim 1, in which said preheat temperature ranges from about 50° to 70°C.

10. The method of claim 1, in which said resin is a copolymer of acrylic acid esters and methacrylic acid esters.

* * * * *